US012375417B2

(12) United States Patent
Frangieh et al.

(10) Patent No.: US 12,375,417 B2
(45) Date of Patent: *Jul. 29, 2025

(54) RESILIENT NETWORK CONFIGURATION FOR TIME SENSITIVE TRAFFIC

(71) Applicant: DOLBY INTELLECTUAL PROPERTY LICENSING, LLC, Wilmington, DE (US)

(72) Inventors: Tony Frangieh, Niskayuna, NY (US); Andrew William Berner, Waterford, NY (US); Stephen Francis Bush, Latham, NY (US); Vincent Staudinger, Niskayuna, NY (US)

(73) Assignee: DOLBY INTELLECTUAL PROPERTY LICENSING, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,040

(22) Filed: Sep. 20, 2023

(65) Prior Publication Data
US 2024/0015106 A1 Jan. 11, 2024

Related U.S. Application Data

(63) Continuation of application No. 16/880,407, filed on May 21, 2020, now Pat. No. 11,799,788, which is a
(Continued)

(51) Int. Cl.
*G06F 15/177* (2006.01)
*H04L 41/0806* (2022.01)
(Continued)

(52) U.S. Cl.
CPC .......... *H04L 47/28* (2013.01); *H04L 41/0806* (2013.01); *H04L 67/34* (2013.01); *H04L 67/62* (2022.05); *H04L 67/12* (2013.01)

(58) Field of Classification Search
CPC ..... H04L 47/28; H04L 41/0806; H04L 67/34; H04L 67/62; H04L 67/12; H04L 47/24;
(Continued)

(56) References Cited

U.S. PATENT DOCUMENTS 5,258,977 A 11/1993 Wolker et al.
6,917,812 B2 7/2005 Damnjanovic
(Continued)

FOREIGN PATENT DOCUMENTS

CN 106973413 A 7/2017
KR 20050061226 A 6/2005

OTHER PUBLICATIONS

Office Action issued in corresponding Russian Patent Application No. 201890745 dated Apr. 7, 2022, with English translation.
(Continued)

*Primary Examiner* — Thuong Nguyen
(74) *Attorney, Agent, or Firm* — Morgan, Lewis & Bockius LLP

(57) ABSTRACT

According to some embodiments, system and methods are provided, comprising receiving, from a network configuration module, configuration data at a network driver of a communication network; configuring the network driver based on the received configuration data; receiving one or more data packets at the network driver from an application; determining that one or more segregation features are present in the data packet based on the received configuration data; transmitting the one or more data packets based on the one or more segregation features; and controlling one or more operations of an installed product based on the transmitted one or more data packets. Numerous other aspects are provided.

29 Claims, 5 Drawing Sheets

Related U.S. Application Data continuation of application No. 15/583,149, filed on May 1, 2017, now Pat. No. 10,805,222.

(51) Int. Cl.
  *H04L 47/28* (2022.01)
  *H04L 67/00* (2022.01)
  *H04L 67/62* (2022.01)
  *H04L 67/12* (2022.01)

(58) Field of Classification Search
  CPC . H04L 47/2441; H04L 47/31; H04L 47/6275; H04L 67/125; H04L 45/302; H04L 41/0816; Y02D 30/00; Y04S 40/00; Y04S 40/18
  USPC ............................................. 709/221
  See application file for complete search history.

(56) References Cited

U.S. PATENT DOCUMENTS

| | | | |
|---|---|---|---|
| 7,653,057 B1 | 1/2010 | Fromm et al. | |
| 8,805,276 B2 | 8/2014 | Li et al. | |
| 9,331,962 B2 | 5/2016 | Lida et al. | |
| 10,805,222 B2 * | 10/2020 | Frangieh | H04L 67/34 |
| 11,799,788 B2 * | 10/2023 | Frangieh | H04L 67/34 |
| 2002/0101870 A1 | 8/2002 | Chase et al. | |
| 2005/0036497 A1 | 2/2005 | Kawakami | |
| 2005/0181835 A1 | 8/2005 | Lau et al. | |
| 2006/0013245 A1 | 1/2006 | Abedi | |
| 2006/0227713 A1 | 10/2006 | Zuberi et al. | |
| 2006/0280119 A1 | 12/2006 | Karamanolis et al. | |
| 2006/0291480 A1 | 12/2006 | Cho et al. | |
| 2007/0097954 A1 | 5/2007 | Wada et al. | |
| 2007/0168468 A1 | 7/2007 | Stogel et al. | |
| 2008/0008159 A1 | 1/2008 | Bourlas et al. | |
| 2009/0138577 A1 | 5/2009 | Casado et al. | |
| 2009/0303876 A1 * | 12/2009 | Wu | H04L 47/32 370/230.1 |
| 2010/0278177 A1 * | 11/2010 | Chase | H04L 12/413 370/389 |
| 2011/0058554 A1 | 3/2011 | Jain et al. | |
| 2011/0317587 A1 | 12/2011 | Lida et al. | |
| 2012/0078440 A1 | 3/2012 | Oravis et al. | |
| 2012/0291028 A1 * | 11/2012 | Kidambi | H04L 49/00 718/1 |
| 2013/0243006 A1 | 9/2013 | Otsuka | |
| 2014/0237170 A1 | 8/2014 | Okita | |
| 2014/0307622 A1 | 10/2014 | Horn et al. | |
| 2014/0341234 A1 | 11/2014 | Asterjadhi et al. | |
| 2014/0362709 A1 | 12/2014 | Kashyap et al. | |
| 2015/0043335 A1 | 2/2015 | Testicioglu et al. | |
| 2015/0043592 A1 | 2/2015 | Kim et al. | |
| 2015/0100625 A1 | 4/2015 | Dilouya et al. | |
| 2015/0103836 A1 | 4/2015 | Chandhoke et al. | |
| 2015/0195374 A1 | 7/2015 | Wang et al. | |
| 2016/0021014 A1 | 1/2016 | Wetterwald et al. | |
| 2016/0094461 A1 * | 3/2016 | Shetty | H04L 49/70 370/235 |
| 2016/0105821 A1 | 4/2016 | Senarath et al. | |
| 2016/0119165 A1 * | 4/2016 | Keronen | H04W 72/02 370/254 |
| 2016/0127250 A1 * | 5/2016 | McCormick | H04L 43/0852 370/235 |
| 2016/0173395 A1 | 6/2016 | Danielsson | |
| 2016/0330286 A1 | 11/2016 | Keith et al. | |
| 2017/0026290 A1 | 1/2017 | Kinoshita et al. | |
| 2017/0187758 A1 | 6/2017 | Denker et al. | |
| 2017/0324652 A1 | 11/2017 | Lee et al. | |
| 2017/0332207 A1 | 11/2017 | Sheng et al. | |
| 2018/0217954 A1 | 8/2018 | Chandhoke et al. | |
| 2018/0237040 A1 | 8/2018 | Mong et al. | |
| 2018/0359155 A1 | 12/2018 | Kaag et al. | |
| 2020/0280522 A1 | 9/2020 | Frangieh et al. | |
| 2021/0014791 A1 | 1/2021 | Freda et al. | |
| 2024/0015106 A1 * | 1/2024 | Frangieh | H04L 41/0806 |

OTHER PUBLICATIONS

Author Unknown, "Time-Sensitive Networking", https://en.wikipedia.org/wiki/Time-Sensitive_Networking#Background, retrieved Oct. 30, 2020, pp. 1-14.
Office Action issued in corresponding Chinese Patent Application No. 201810392201.9 dated Jun. 9, 2021, with English translation.
Office Action issued in corresponding Russian Application No. 201890745/31 dated Jun. 11, 2021, with English translation.
The Indian Office Action which was received on Jan. 20, 2021 for counterpart Indian Application No. 201844016011.
Israeli Office Action dated Dec. 19, 2019 which was issued in a counter part application IL258869. Agent translation is attached.
Eurasian Office Action dated Oct. 19, 2020 which was issued in a counter part application EA 201890745.
Lakhtina: "Technical Support of Telematics Systems. Cable communication lines. CAN bus. Methodical Instructions", Moscow MADI 2016—the closest analog, (see pp. 37-39, paragraph 2.3, and in particular, see pp. 57-61, paragraph 2.9 (2.9.1)).
Internet Article: "Cisco switch taps into Time Sensitive Ethernet; software bolsters industrial network mgmt", published on the Internet portal "Network World" on Apr. 25, 2017 https://www.networkworld.com/article/3192353/cisco-switch-taps-into-time-sensitive-ethernet-software-bolsters-industrial-network-mgmt.html.

* cited by examiner

| Segregation property | Rule | QoS Parameters | Tag |
|---|---|---|---|
| Port 123 | Scheduled | | VLAN_ID 1 |
| QoS parameter | Unscheduled | Non-critical | |
| | | | |

RESILIENT NETWORK CONFIGURATION FOR TIME SENSITIVE TRAFFIC

CROSS REFERENCE TO RELATED APPLICATIONS

This is a continuation of U.S. patent application Ser. No. 16/880,407 filed May 21, 2020, which is a continuation of U.S. patent application Ser. No. 15/583,149, filed on May 1, 2017, now U.S. Pat. No. 10,805,222 entitled "RESILIENT NETWORK CONFIGURATION FOR TIME SENSITIVE TRAFFIC", each of which is incorporated herein by reference in its entirety for all purposes.

BACKGROUND

Industrial equipment or assets, generally, are engineered to perform particular tasks as part of industrial processes. For example, industrial assets may include, among other things and without limitation, manufacturing equipment on a production line, aircraft engines, wind turbines that generate electricity on a wind farm, power plants, locomotives, healthcare or imaging devices (e.g., X-ray or MRI systems), surgical suites for use in patient care facilities, or drilling equipment for use in mining operations. The design and implementation of these assets often takes into account both the physics of the task at hand, as well as the environment in which such assets are configured to operate and the specific operating control these systems are assigned to. Various types of control systems communicate data between different sensors, devices, user interfaces, etc. in order to enable control operations of other powered systems.

The operations of these powered systems may rely on on-time and accurate delivery of data among various devices. Failure to deliver some data at or within designated times may result in failure of the powered system, which may have disastrous consequences. For example, the failure to deliver sensor data to a control system of a locomotive or rail vehicle system may result in the locomotive or rail vehicle system not applying brakes early enough to avoid a collision. As another example, the failure to deliver sensor data to a control system of a surgical suite may result in a delay of life-saving measures. Other control systems may fail to implement protective measures to avoid damage or injury to the systems or other equipment if data is not supplied at or within the designated times. Without timely information, feedback control systems cannot maintain performance and stability.

Some systems may use a time sensitive network (TSN) to communicate data. Communications within a TSN may be scheduled using a single device (e.g., an offline scheduling system) that assumes fixed, non-changing paths through the network nodes between communication devices. The TSN may also receive non-time sensitive communications, such as rate constrained communications and "best effort" communications.

Two conventional approaches to scheduling and forwarding time sensitive data are: 1. A top-down trend, where an application code forwards data to different TSN channels based on a data class; and 2. A bottom-up trend, where a TSN switch is extended by deep packet inspection capability and segregates data based on packet content.

However, with the top-down trend, a networking section of an application is completely re-written, which may be undesirable, and the re-writing puts the burden of writing to the correct path on the application developer. With the bottom-up trend, the solution space may be limited to switches with deep packet inspection only.

It would be desirable to provide systems and methods to improve communication traffic flow through a TSN network to optimize operational control of a powered system.

BRIEF DESCRIPTION

According to some embodiments, a method includes receiving, from a network configuration module, configuration data at a network driver of a communication network; configuring the network driver based on the received configuration data; receiving one or more data packets at the network driver from an application; determining that one or more segregation features are present in the data packet based on the received configuration data; transmitting the one or more data packets based on the one or more segregation features; and controlling one or more operations of an installed product based on the transmitted one or more data packets.

According to some embodiments, a system includes an installed product, including a plurality of components; a computer programmed with a network configuration module for the installed product, the network configuration module for configuring a communication network to control operations of the installed product; the computer including a processor and a memory in communication with the processor, the memory storing the network configuration module and additional program instructions, wherein the processor is operative with the network configuration module and additional program instructions to perform functions as follows: receive, from the network configuration module, configuration data at a network driver of the communication network; configure the network driver based on the received configuration data; receive one or more data packets at the network driver from an application; determine that one or more segregation features are present in the data packet based on the received configuration data; transmit the one or more data packets based on the one or more segregation features; and control one or more operations of an installed product based on the transmitted one or more data packets.

According to some embodiments, a non-transitory, computer-readable medium storing instructions that, when executed by a computer processor, cause the computer processor to perform a method comprising: receiving, from a network configuration module, configuration data at a network driver of a communication network; configuring the network driver based on the received configuration data; receiving one or more data packets at the network driver from an application; determining that one or more segregation features are present in the one or more data packets based on the received configuration data; transmitting the one or more data packets based on the one or more segregation features; and controlling one or more operations of an installed product based on the transmitted one or more data packets.

A technical effect of some embodiments of the invention is an improved and/or computerized technique and system for dynamically configuring a network driver and a network switch to control a path of time-sensitive data and non-time-sensitive data through a network. Embodiments provide for the extension of network drivers with a configuration interface to enable segregation of features of the data without the need to re-write the application, or extend the switch with proprietary firmware. Embodiments provide for the configuration of the network driver by a network configuration module, such that no update to the existing application code is needed. Embodiments provide for the network configuration module to configure the switch, such that the configured network driver may be used with any off-the-shelf switch compliant with IEEE 802.1Qbv and associated standards, or any other suitable switch. For example, a real world benefit is that complex control system code, such as that found in aircraft, locomotives, and power plants will not require expensive code changes to utilize the benefits of TSN. Other real world benefits include changing the classification of a data flow form an application from the non-time-sensitive domain to the time-sensitive domain without changing the original application. An example of this would be an application that performed an analytic on the health of an asset. The original use of the analytic may be for asset performance or health monitoring. In the future, the system may use that same information to change how to actively control the same asset based on the results of the analytic. Without changing the original application, the network driver may be configured to include the now critical data flow into the time-sensitive domain without any software changes. The previously non-critical data flow now becomes included in the critical traffic without changing the original application. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
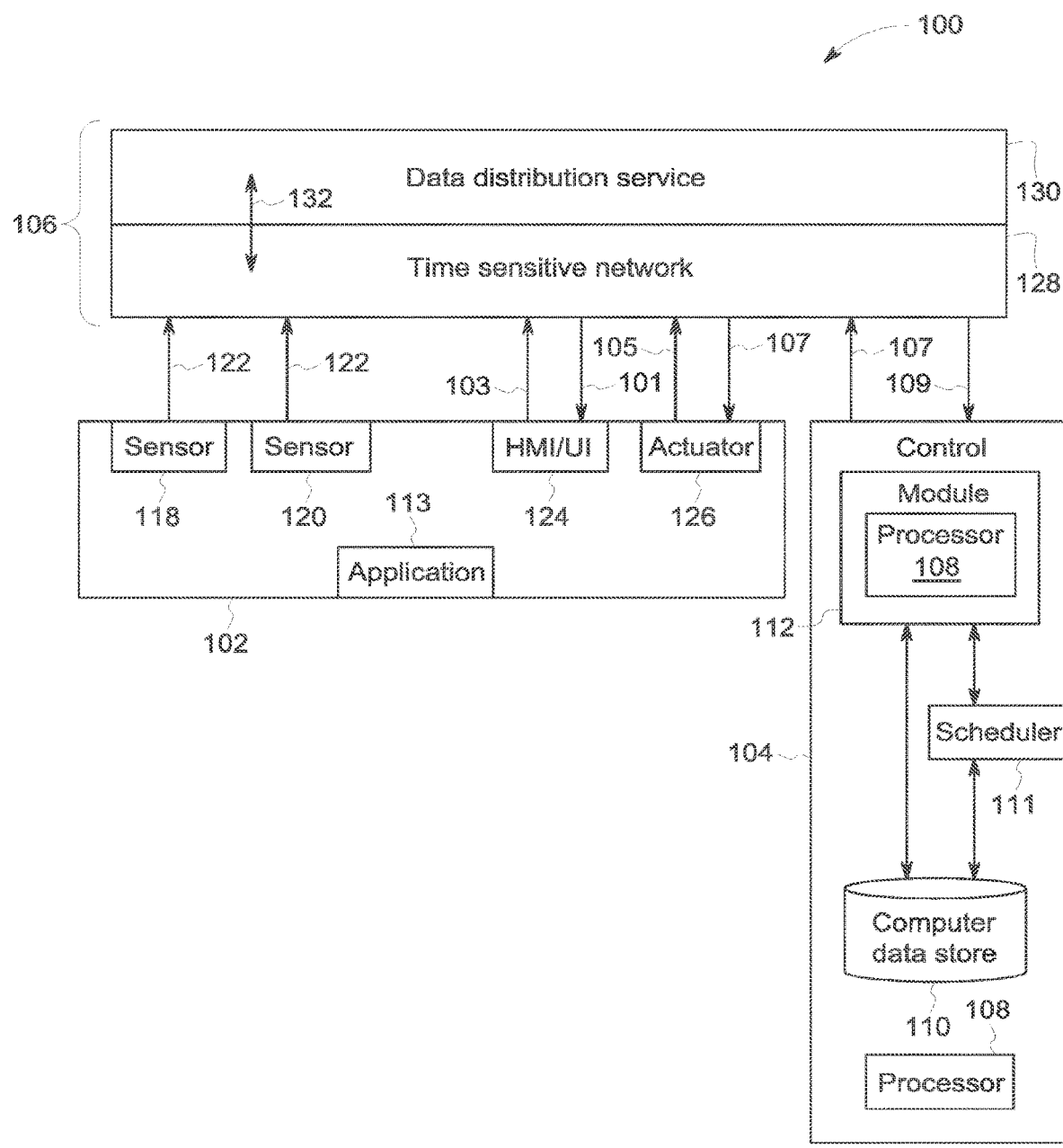
FIG. 1 illustrates a system according to some embodiments.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have disastrous consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). The feedback control system may continuously receive feedback and make adjustments to maintain a desired state. In one or more embodiments, the performance of the system may depend upon the timely receipt of the state information. If state feedback information is delayed, the entire control system may become unstable and may go out of control, causing catastrophic behavior.

Some systems may use a time sensitive network (TSN) to communicate data associated with a particular application used in the control system. The TSN may be at least partially defined by a set of standards developed by the Time-Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

Conventionally, extending a TSN to network applications requires (1) modification to the application code, or (2) modification to the network switch firmware. However, it may be undesirable to update the application code because (a) the application code is not available, (b) the application code may have been validated to some degree, and it may be undesirable to have to re-verify control loops executed per the application, and/or (c) it may expose networking scheduling issues to software developers and non-domain experts. Further, it may be undesirable to modify the network switch firmware because (a) it may eliminate the use of off-the-shelf switches, thereby limiting the choice of switches, and (b) of the added effort and support needed to implement proprietary changes to the network switch firmware.

In one or more embodiments, a network driver may be configured by an external network configuration module, so that no update to the application code is needed. Configuration of the network driver may instruct the network driver how to classify data based on different rules. The network driver may then package the data based on the classification, and then send the packaged data to a switch. In one or more embodiments, the switch may also be configured by the network configuration module. The switch configuration may instruct the switch how/when to send the data to a final destination, per a schedule and based, at least in part, on the classification of the data. In one or more embodiments, the schedule may include instructions about when to open and close one or more gates of one or more network queues to allow the transmission of the data.

The term "installed product" should be understood to include any sort of mechanically operational entity or asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain and etc. As used herein, the terms "installed product," "asset," and "powered system" may be used interchangeably.

As used herein, the term "automatically" may refer to, for example, actions that may be performed with little or no human interaction.

Turning to FIG. 1, a block diagram of a system 100 architecture is provided according to some embodiments. The system 100 may include at least one installed product 102. As noted above, the installed product 102 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 102 may include a control system 104 that controls operations of the installed product based on data obtained by, or generated by, and/or communicated among, devices of the installed product, and communicates information between or among installed products, etc. to allow for automated control of the installed product, to provide information to operators of the installed product.

In one or more embodiments, the system 100 may include a communication system 106. The communications system 106 may be used by the control system 104 ("Control") to communicate data between or among devices of the control system 104 and/or the installed product 102 that is controlled by the control system 104. The control system 104 may represent hardware circuitry that includes and/or is connected with one or more processors 108 (e.g., microprocessors, integrated circuits, field programmable gate arrays, etc.) that perform operations to control the installed product 102. In one or more embodiments, the processor 108 may be programmed with a continuous or logistical model of industrial processes that use the one or more installed products 102.

In one or more embodiments, the control system 104 may include a computer data store 110 that may provide information to a scheduler 111 and a network configuration module 112, and may store results from the scheduler 111 and the network configuration module 112. The communication system 106 may supply data from at least one of the installed product 102 and the data store 110 to the scheduler 111 and the network configuration module 112. The network configuration module 112 may include one or more processing elements 108. The processor 108 may, for example, be a conventional microprocessor, and may operate to control the overall functioning of the network configuration module 112.

Figure 3:
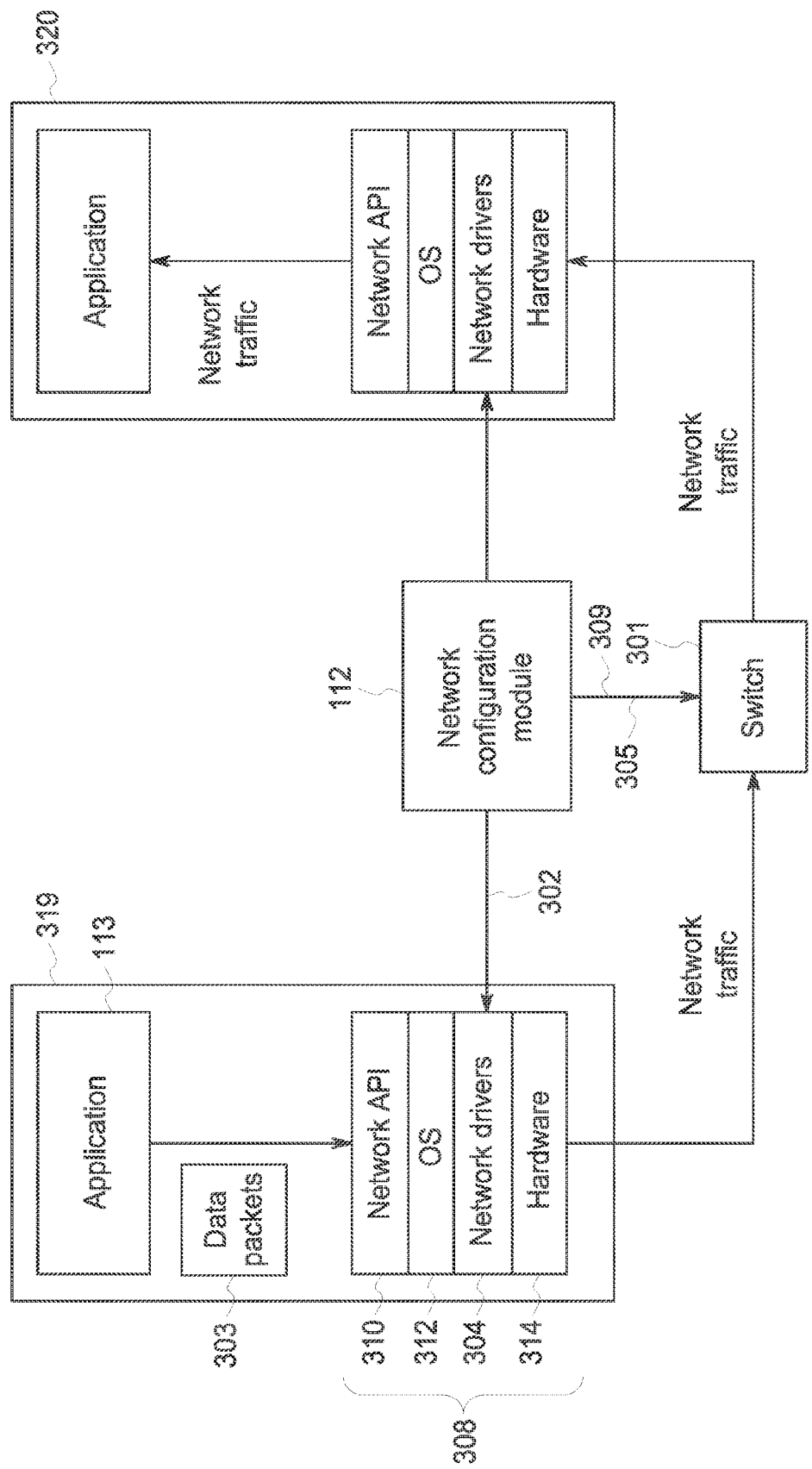
FIG. 3 illustrates a block diagram according to some embodiments.

In one or more embodiments, the network configuration module 112 may provide configuration instructions 302 to a network driver 304 (FIG. 3). The configuration instructions 302 may provide rules to the network driver 304 for the network driver to classify a data packet, create a frame format for the data packet based on the classification, and then package the data packet into one or more data frames based on the created frame format.

In one or more embodiments, the network configuration module 112 may transmit switch configuration data 305 to the scheduler 111 to generate a schedule 310 (FIG. 4) for the transmission of each data frame through the communication system per the schedule 310. In one or more embodiments, the scheduler 111 may also receive a network topology description and path or link requirements 406 (e.g., an indication of time sensitive paths, maximum latencies, physical link bandwidths, size of frames ("payload"), and frame destination) from an application 113 and/or toolchain, or any other suitable source. As used herein, "maximum tolerable latency" may refer to the latest time the data frame may arrive at the destination. The scheduler 111 may also receive destination information 321 (e.g., an Ethernet address). In one or more embodiments, link layer discovery protocol (LLDP) may be used to gather informational about the network prior to scheduling. about a destination 320 for each data frame. In one or more embodiments, the destination information 321 may be provided by an application being executed by the control system 104.

In one or more embodiments, the control system 104 may control one or more operations of the installed product 102 based on the transmitted data frame(s) 404.

In one or more embodiments, the data store 110 may comprise any combination of one or more of a hard disk drive, RAM (random access memory), ROM (read only memory), flash memory, etc. The data store 110 may store software that programs the processor 108, the scheduler 111 and the network configuration module 112 to perform functionality as described herein.

In some embodiments, the communication system 106 may supply output from at least one of the scheduler 111 and the network communication module 112 (and the elements included in therein) to at least one of user platforms 124, back to the installed product 102, or to other systems. In some embodiments, signals received by the user platform 124, installed product 102 and other systems may cause modification in the state or condition or another attribute of one or more physical elements of the installed product 102.

The communication system 106 may communicate data between several devices of the installed product 102, such as sensors 118, 120 that monitor, measure, record, etc. information and communicate this information as sensor data 122. Another device that may communicate via the communications system 106 may include a human machine interface (HMI) or user interface (UI) 124 that receives output or status data 101 that is to be presented to a user or operator of the communication system 106 or control system 104 and that may communicate input data 103 received from the user or operator to one or more other devices of the control system 104. The HMI/UI 124 may represent a display device, a touchscreen, laptop, tablet computer, mobile phone, speaker, haptic device, or other device that communicates or conveys information to a user or operator. In accordance with any of the embodiments described herein, a user may access the system 100 via one of the HMI/UI 124 to view information about and/or manage the installed product 102.

In one embodiment, at least one of the sensors 118, 120 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that may communicate using the communication system 106 may include one or more actuators 126, which may represent devices, equipment, or machinery that move to perform one or more operations of the installed product 102 that is controlled by the control system 104. Examples of actuators 126 include brakes, throttles, robotic devices, medical imaging devices, lights, turbines, etc. The actuators 126 may communicate status data 105 of the actuators 126 to one or more other devices of the installed product 102 via the communication system 106. The status data 105 may represent a position, state, health, or the like, of the actuator 126 sending the status data 105. The actuators 126 may receive command data 107 from one or more other devices of the installed product or control system via the communication system 106. The command data 107 may represent instructions that direct the actuators 126 how and/or when to move, operate, etc.

The control system 104 may communicate (e.g., receive, transmit, and/or broadcast) a variety of data between or among the devices via the communication system 106 at the behest of one or more software applications 113. For example, the control system 104 may communicate the command data 107 to one or more of the devices and/or receive data 109, such as status data 105 and/or sensor data 122, from one or more of the devices. While devices are shown in FIG. 1 as sending certain data or receiving certain data, optionally, the devices may send and/or receive other types of data. For example, the sensors 118, 120 may receive data and/or send other types of data.

The communication system 106 communicates data between or among the devices and/or control system 104 using a communication network 128 that may communicate data using a data distribution service 130. As known in the art, the data distribution service 130 is a network "middleware" application that may make it easier to configure publishers and subscribers on a network. Other middleware applications may be used. In other embodiments, the data distribution service 130 is not included, and the application(s) 113 may manage the installed product 102 (and its devices) on its own. The network 128 (from FIG. 1) is a time sensitive network, but alternatively may be another type of network. For example, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data distribution service 130 may represent an object management group (OMG) device-to-device middleware communication standard between the devices and the network. The data distribution service 130 may allow for communication between publishers and subscribers. The term "publisher" may refer to devices 104, 118, 120, 124, and 126 that send data to other devices 104, 118, 120, 124, 126 and the term "subscriber" may refer to devices 104, 118, 120, 124, and 126 that receive data from other devices 104, 118, 120, 124, and 126. The data distribution service 130 is network agnostic in that the data distribution service 130 may operate on a variety of networks, such as Ethernet networks as one example. The data distribution service 130 may operate between the network through which data is communicated and the applications communicating the data (e.g., the devices 104, 118, 120, 124, and 126). The devices 104, 118, 120, 124, and 126 may publish and subscribe to data over a distributed area to permit a wide variety of information to be shared among the devices 104, 118, 120, 124, and 126.

In one embodiment, the data distribution service 130 may be used by the devices 104, 118, 120, 124, and 126 to communicate data 101, 103, 105, 107, 109, 122 through the network 128, which may operate on an Ethernet network of the installed product 102. The network 128 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." In this non-deterministic or "best effort" approach, a network driver may receive data from an application and determine for itself how to package and send the data. As a result, some data may not reach devices connected via the non-TSN Ethernet network in sufficient time for the devices to operate using the data. With respect to some control systems, the late arrival of data may have disastrous consequences, as described above. A TSN-based Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 106 may use the network 128 to communicate data between or among the devices 104, 118, 120, 124, and 126 (in some embodiments using the data distribution service 130) in order to maintain Quality of Service (QoS) parameters 132 of certain devices 104, 118, 120, 124, and 126. As used herein, "QoS" may refer to a time-sensitive networking quality of service. In one or more embodiments, the QoS parameters 132 of the devices 104, 118, 120, 124, and 126 may represent requirements for data communication between or among the devices 104, 118, 120, 124, and 126, such as upper limits on the amount of time or delay for communicating data between or among the devices 104, 118, 120, 124, and 126.

In one or more embodiments, the QoS parameter 132 may dictate a lower limit or minimum on data throughput in communication between or among two or more devices 104, 118, 120, 124, and 126. In one or more embodiments, the QoS parameter 132 may be used to ensure that data communicated with one or more devices 104, 118, 120, 124, and 126, to one or more devices 104, 118, 120, 124, and 126, and/or between two or more devices 104, 118, 120, 124, and 126 is received in a timely manner (e.g., at designated times or within designated time periods). In one or more embodiments, the QoS parameter 132 may be defined by one or more other parameters. Examples of these other parameters may include a deadline parameter, a latency parameter, and/or a transport priority parameter.

The deadline parameter may, in one or more embodiments, dictate an upper limit or maximum on the amount of time available to send and/or receive data associated with a particular topic. In one or more embodiments, the deadline parameter may relate to the total time the data spends in an application, operating system and network. Data may be associated with a particular topic when the data is published by one or more designated devices (e.g., sensors measuring a particular characteristic of the installed product, such as speed, power output, etc.). Then the data may represent the particular characteristic (even if the data comes from different devices at different times), and/or is directed to the same device (e.g., the same actuator 126).

In one or more embodiments, the latency parameter may dictate an upper limit or maximum on a temporal delay in delivering data to a subscribing device 104, 118, 120, 124, and 126. For example, the sensors 118, 120 may publish data 122 representative of operations of the installed product, and the HMI/UI 124, actuator 126, and/or control system 104 may require receipt of the sensor data 122 within a designated period of time after the data 122 is published by the sensors 118, 120. For example, for a sensor 118 that communicates a temperature of a motor or engine reaching or exceeding a designated threshold indicative of a dangerous condition, the control system 104 and/or actuator 126 may need to receive this temperature within a designated period of time to allow the control system 104 and/or actuator 126 to implement a responsive action, such as decreasing a speed of the engine or motor, shutting down the engine or motor, etc. In one or more embodiments, the latency parameter may refer to the time the data spends in the network only. In one or more embodiments, the TSN 128 may only relate to a network portion of the delay (as opposed to delays in the application, and operating system portions).

In one or more embodiments, the transport priority parameter may indicate relative priorities between two or more of the devices 104, 118, 120, 124, and 126 to the network. Some devices 104, 118, 120, 124, and 126 may have higher priority than other devices 104, 118, 120, 124, and 126 to receive (or subscribe to) certain identified types or sources of data. Similarly, some devices 104, 118, 120, 124, and 126 may have higher priority than other devices 104, 118, 120, 124, and 126 to send (or publish) certain identified types or sources of data. Subscribing devices 104, 118, 120, 124, and 126 having higher priorities than other devices 104, 118, 120, 124, and 126 may receive the same data via the network from a source of the data prior to the lower-priority devices 104, 118, 120, 124, and 126. Publishing devices 104, 118, 120, 124, and 126 having higher priorities than other devices 104, 118, 120, 124, and 126 may send the data that is obtained or generated by the higher-priority devices 104, 118, 120, 124, and 126 into the network than lower-priority devices 104, 118, 120, 124, and 126.

In one or more embodiments, the QoS parameters 132 of the devices 104, 118, 120, 124, and 126 may be defined by one or more, or a combination, of the deadline parameter, latency parameter, and/or transport priority parameter. In one or more embodiments, the QoS parameters 132 may then be used by the scheduler 111 to determine data transmission schedules 310 within the TSN (in some embodiments, using the data distribution service 130). Data transmission schedules 310 may dictate times at which data is communicated within the network at nodes along the path. However, by providing time for the "nodes along the path," the schedule also suggests the path itself. The inventors note that the suggested path may not be obvious if there are many TSN flows taking common paths.

Figure 2:
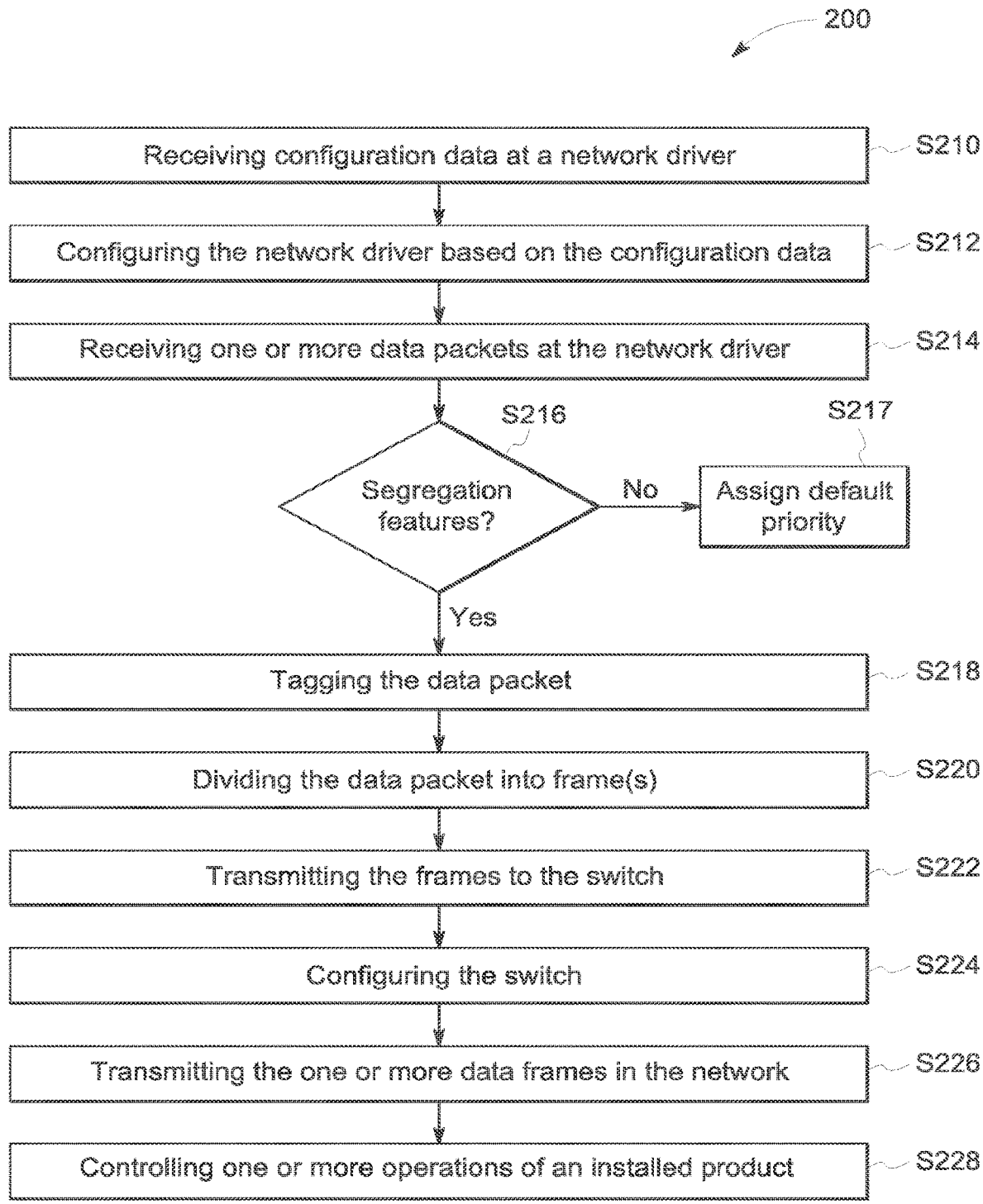
FIG. 2 illustrates a flow diagram according to some embodiments.

Turning to FIGS. 2-5, flow diagrams and a block diagrams, of an example of operation according to some embodiments is provided. In particular, FIG. 2 provides a flow diagram of a process 200, according to some embodiments. Process 200, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

In one or more embodiments, the network 128 may include a plurality of destinations 320 or nodes. The nodes may be connected to the communication system via one or more communication paths 322 or links. The communication links 322 may be connected to each other via ports and/or switches 301. In one or more embodiments, two or more data frame transmission paths or flows may overlap. Data frames 404 may collide where these transmission paths overlap, and collisions may result in the frames being dropped and not delivered to their respective destinations 320. As such, the scheduler 310 may fit unscheduled/best effort frames into the schedule 310 with scheduled frames, so that the data frames 404 do not collide, and instead reach an appropriate destination at an appropriate time.

In one or more embodiments, the TSN network 128 may include a plurality of queues 312 (e.g., Queue 0, 1, 2, 3, 4 . . . 7, etc.) for transmitting the data frames 404 to their respective destinations 320. In one or more embodiments, the queues may exist in all interfaces—both on the end-system (e.g., device) and in each port (connection) of the switch 301. In one or more embodiments, each queue 312 may include a gate 313 that may be in an open position 314 or a closed position 316, and may only allow transmission of the data frame 404 when in the open position 314. In one or more embodiments, the operation of the queue gates 313 may be synchronized to a same clock 318. Of note, the synchronization is important, especially for high priority traffic, to make sure the gates are closed at precisely the right time, to avoid collision and to get the data frame through the network per the schedule 310. In one or more embodiments, the scheduler 111 executes calculations, based on the received input, to determine the openings/closing gate times along the path of the flow to meet the destination 320 and arrival times (e.g., within the maximum latency), as specified by the application 113. In one or more embodiments, the content of the schedule 310 specifies gate openings/closings along the path of a flow, as described in the TSN standard.

In one or more embodiments, prior to beginning process 200, a configuration map 500 (FIG. 5) may be created to identify at least one segregation feature or property 502 that may occur in the data packet. As used herein, "segregation feature" and "property" maybe used interchangeably. In one or more embodiments, the configuration map 500 may also provide rules 504 for how to create a frame format for the data packet based on the identified segregation features 502. In one or more embodiments, the configuration map 500 may include a tag 506 associated with each segregation feature 502. In one or more embodiments, the segregation features 502 and rules 504 populating the configuration map 500 may be provided by at least one of the system and a network administrator. In one or more embodiments, the segregation feature 502 may be at least one of a QoS parameter 132, a port number, a packet content and an IP destination node. Other suitable segregation features 502 may be used. For example, the segregation feature 502 may be a QoS parameter indicting the data packet is one of critical or non-critical. In one or more embodiments, the packet content may be associated with a particular topic. The pre-defined "topic" may be the segregation feature 502.

As will be described further below, in one or more embodiments, after creating the frame format, the network driver may then package the data packet into one or more data frames 404 based on the created frame format. Of note, by having the network driver create a frame format based on the segregation features, no changes need to be made to the application itself to change a data packet from a "best effort" communication to a "time-sensitive" (e.g., scheduled) communication, for example.

As described above, the TSN network 128 may allow for the transmission of both classes of communication (e.g., scheduled and best effort/random) in the same network. Conventionally, the standard may be to send all communications as "best effort" (e.g., unscheduled), unless specifically marked by the application. Best-effort messages (frames) are simply that, a "best-effort" attempt at transporting the frame to its destination. For example, the network will try to deliver the frame, but it may fail or take a long time to deliver the frame. Such frame loss or delay in a control system may be catastrophic, for example, the system may become unstable causing a generator to explode, an aircraft engine to malfunction in flight, or a medical system to give a false reading, as a few examples. Determination if a data flow is time-sensitive or best effort is up to the system designer(s). Embodiments allow common re-usable application blocks to be re-used in different systems as best effort or time-sensitive depending on the system need. In the previously described analytic application, the data flow created (the health or performance analysis) does not have implied context. What the system uses the data for may create the context and therein also may determine if the data shall be treated as critical and time-sensitive or non-critical and best effort.

As shown in FIG. 3, for example, the TSN 128 may include a network stack 308 that may route data and information through the networked devices, such as routers, switches (e.g., Ethernet switches) or other devices that communicate data packets between different devices in the system 100. The network stack 308 may be composed of several operational or functional layers (e.g., a network Application Program Interface (API) 311, an Operating System (OS) 312, one or more network drivers 304, and hardware 314. During execution, the application 113 at a source node 319 may transmit one or more data packets 303 to control operations of the installed product 102. While FIG. 3 shows only two nodes, this is only an example, and the system 100 may include any suitable number of nodes. In one or more embodiments, two nodes may have multiple links between them that may mirror/duplicate the transmission of data in parallel to ensure reliability (e.g., this way if the transmission of one data fails, the data will be transmitted on the other link).

Initially at S210, network configuration data 302 is received at a network driver 304. In one or more embodiments, the network configuration data 302 may be stored in the configuration map 500. In one or more embodiments, the network configuration data 302 may be transmitted from the network configuration module 112 to the network driver 304 via a configuration channel 306.

In one or more embodiments, prior to receipt of the network configuration data 302, the network driver 304 may package the data frames 404 that make up the data packet 303 per a default frame format of "best effort," unless data associated with the packet indicates otherwise. Conventionally, to change how a data packet is sent (e.g., to change from "best effort" to scheduled/time-sensitive, changes would be made at the application to establish different paths. IN one or more embodiments, on the other hand, changes are made at the network driver instead of the application to change from "best effort" to time-sensitive. As described above, it may be beneficial to change the network driver instead of the application because (a) the application code is not available, (b) the application code may have been validated to some degree, and it may be undesirable to have to re-verify control loops executed per the application, and/or (c) it may expose networking scheduling issues to software developers and non-domain experts Then in S212, the network driver 304 is configured based on the received configuration data 302. In one or more embodiments, the network configuration module 112 may, via the configuration data 302, specify the criteria for the network drivers 304 to use when tagging/segregating the data packet 303, as well as to specify the QoS parameters 132 for different paths. In one or more embodiments QoS parameters 132 may be specified for both the end-systems and the switches. In one or more embodiments, the network configuration module 112 may also set other parameters for operation of the TSN 128. In one or more embodiments, the network driver 304 may be configured to: analyze a received data packet 303 to determine an appropriate frame format for further transmission of the data packet 303; tag the data packet to indicate the appropriate frame format; and then divide the data packet 303 into one or more data frames 404 having the appropriate frame format.

Then at S214, one or more data packets 303 are received at the network driver 304. In one or more embodiments, the application 113 transmits the data packet 303 to the network stack 308, and in particular to the network driver 304 per instructions from the network API 311. In one or more embodiments, the application 113 may transmit the data packet 303 as a "best-effort" data packet. As will be further described below, the network driver 304 may then intercept this data packet and may segregate/tag the packet according to the rules in the configuration map 500. As will also be further described below, the switch 301 may also use the segregation/tagging to segregate the data frames into different paths.

In one or more embodiments, the network driver 304 may analyze the received data packet 303 with respect to the received configuration data 302. In one or more embodiments, the analysis may determining whether the received data packet 303 includes any segregation features in S216. During segregation, in one or more embodiments, the network driver 304 may determine whether any of the features included in the configuration data 302 are the same as, or substantially the same as, any segregation features 502 in the data packet 303.

In one or more embodiments, the feature in the data packet 303 may exactly match the segregation feature 502 in the configuration map 500 for the feature to be identified as a segregation feature 502. In one or more embodiments, the feature in the data packet 303 may substantially, but not exactly, match the segregation feature 502 in the configuration map 500 for the network driver 304 to determine the segregation feature is present. In one or more embodiments, a threshold may be applied to determine whether a feature that does not exactly match the segregation feature 502 in the configuration map 500 may still be considered a segregation feature. For example the threshold may be 10%, such that if a feature in the data packet 303 matches 90% or more of the segregation feature 502 in the configuration map 500, the feature may be considered a segregation feature. Other suitable thresholds may be used. In one or more embodiments, the threshold may be set by an administrator or any other suitable party. In one or more embodiments, entropy (e.g., the degree of randomness of the data) may be used to stochastically segregate traffic classes. In particular, entropy may relate to a degree of compression of the frame. For example, with executable data, the binary output of a processor may be complex and may then be hard to compress; it may have a lower degree of compression. A text document, on the other hand, may be comparatively simpler and then easy to compress; it may have a higher degree of compression. In one or more embodiments, a threshold may be used to determine whether the degree of compression correlates to a best-effort classification or a time-sensitive classification. In one or more embodiments, for life-critical operations, for example, an exact match may be used.

If it is determined in S216 that the data packet 303 includes no segregation features 502, the process proceeds to S217, and the data packet may be assigned a default priority (e.g., highest/"whitelist" priority or lowest/"blacklist") as set by an administrator or other suitable party. If it is determined in S216 that the data packet 303 includes a segregation feature 502, the data packet 303 may be tagged with a tag 506 to indicate the appropriate frame format in S218, based on the determined segregation feature. In one or more embodiments, the tag 506 may indicate at least one of a priority of the frame (e.g., over other frames, and that a frame may be dropped if there is congestion and it has a lower priority), a scheduling time frame (in the form of maximum tolerable latency), a reliability indicator, and a traffic shaping element. For example, a data packet 303 may include "port 1234" as the segregation feature 502. Based on the configuration map 500, data packets 303 with a port 1234 segregation feature may use a distinct VLAN ID (Virtual Local Area Network Identification) from all other non-scheduled packets. In this example, "VLAN_ID 1" may be the tag 506 for this data packet 303, while all other packets may be tagged with "VLAN_ID 0" 506. In one or more embodiments, tagging is accomplished in software via the driver. In one or more embodiments, the configuration map 500 may include a hierarchy of rules whereby if multiple segregation features 502 are detected, the rules having a higher priority may be applied to the data frame. Then the network driver 304 may divide the data packet 303 into one or more data frames 404 having the frame format commensurate with the tag 506 in S220.

Then in S222, the one or more data frames 404 may be transmitted from the network driver 304 to the switch 301.

In S224, the switch 301 is configured. In one or more embodiments, the scheduler 111 may receive, as input, switch configuration data 305 from the network configuration module 112. The switch configuration data 305 may be transmitted from the network configuration module 112 to the scheduler 111 via a configuration channel 309. The scheduler 111 may also receive, as input, data frames 404 including tags 304 from the network driver 304. Based on the input, the scheduler 111 may then generate a schedule 310 to configure the switch 301 and establish a flow to a destination node 320. In one or more embodiments, the switch 301 may monitor all data frames 404 received from the network driver 304 and may discriminate and forward the data frames 404 based on the schedule 310. In one or more embodiments, "configuration of the switch" may describe the scheduled opening and closing of the gates 313.

Figure 4:
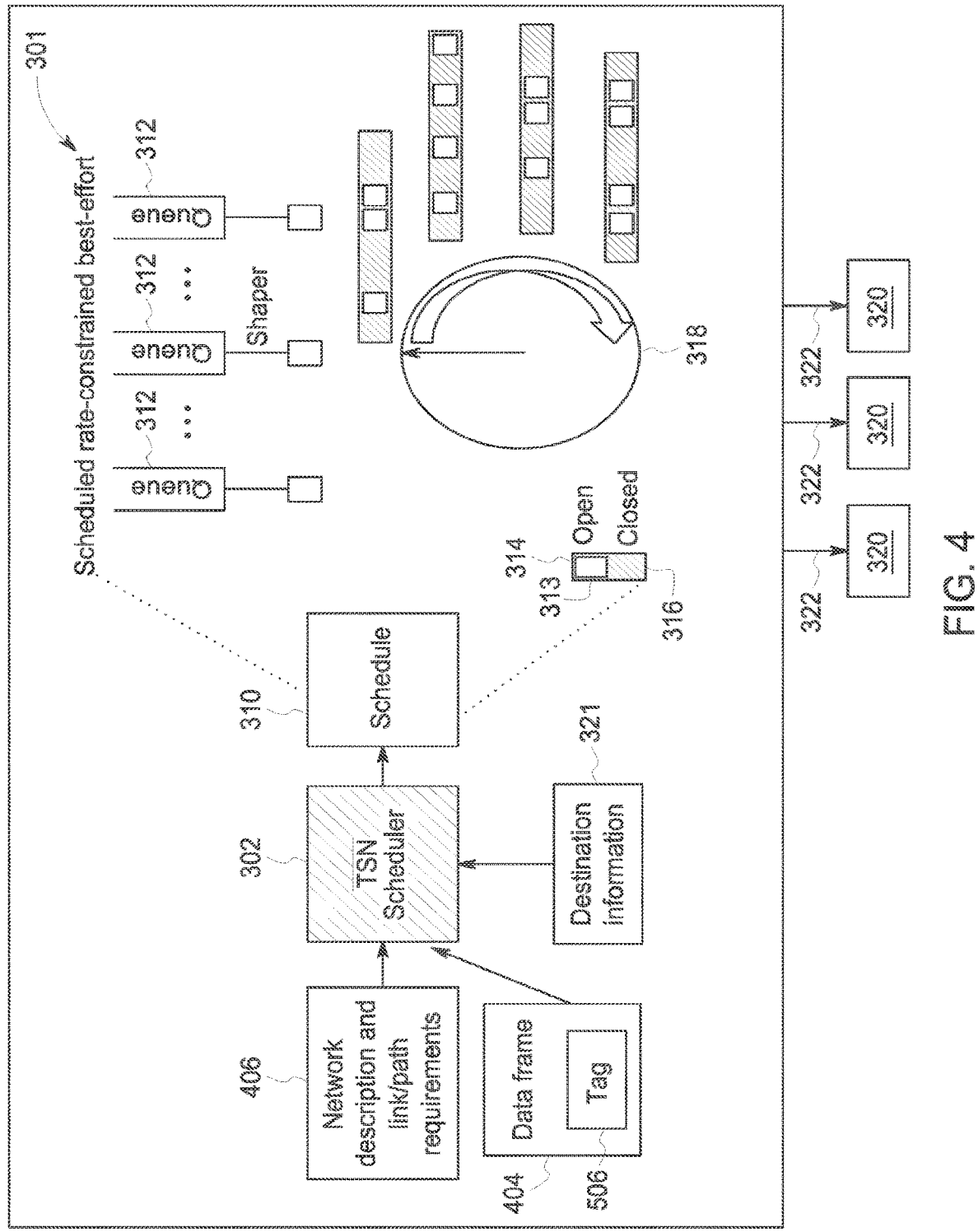
FIG. 4 illustrates a block diagram according to some embodiments.

While FIG. 4 shows the scheduler 111 located within the switch 301, the scheduler 111 may reside anywhere within the network 128. In one or more embodiments, the scheduler 111 may communicate with all switches and end systems to configure them. In one or more embodiments, the scheduler 111 may also receive as input the destination 320 of the data frames (in the form of destination information 321), and a network topology description and path or link requirements 406 (e.g., an indication of time sensitive paths, maximum latencies, physical link bandwidths, size of frames ("payload")) from an application and/or toolchain, or any other suitable source. The scheduler 111 may receive other suitable input.

Then in S226, the schedule 310 is executed and the one or more data frames 404 are transmitted through the network 128 based on the schedule 310. And then in S228, one or more operations of the installed product 102 may be controlled based on the transmitted data frames 404. For example, as described above, the locomotive or rail vehicle system may not apply its brakes early enough to avoid a collision based on the transmitted data frames 404.

In one or more embodiments, the schedule 310 may dynamically change while the schedule 310 is being executed. For example, with respect to a feedback control system, the system may be tasked with maintaining a stability of the system, and may make changes to the QoS parameter input, for example. These changes may be fed back to the network configuration module 112 to dynamically change the segregation and tagging of a data packet, or at least one data frame in the data packet, which in turn may change the schedule 310 as the schedule 310 is being executed.

Figures 5, 6:
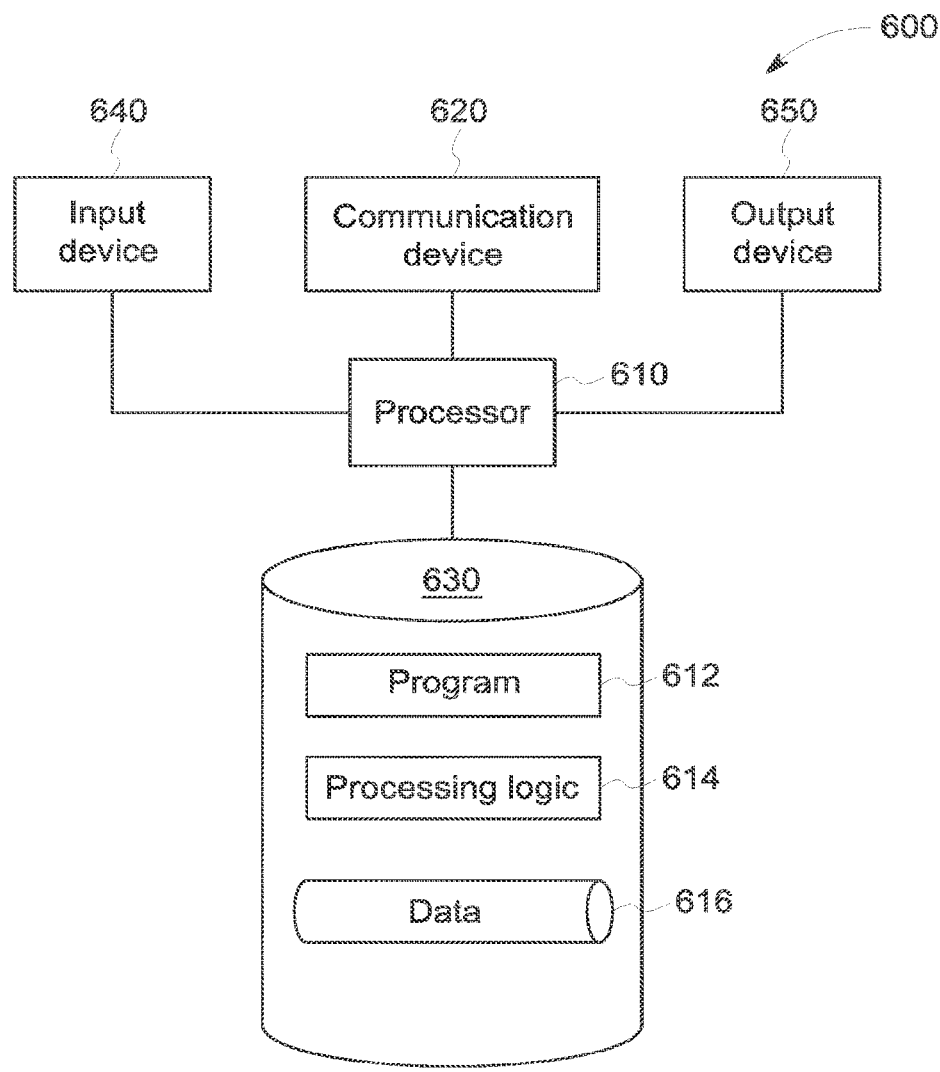
FIG. 5 illustrates a map according to some embodiments.
FIG. 6 illustrates a block diagram of a system according to some embodiments.

Note the embodiments described herein may be implemented using any number of different hardware configurations. For example, FIG. 6 illustrates a network configuration platform 600 that may be, for example, associated with the system 100 of FIG. 1. The network configuration platform 600 comprises a network configuration processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users. The network configuration platform 600 further includes an input device 640 (e.g., a mouse and/or keyboard to enter information) and an output device 650 (e.g., to output and display installed product information).

The processor 610 also communicates with a memory/storage device 630. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or network configuration processing logic 614 for controlling the processor 610. The processor 610 performs instructions of the programs 612, 614, and thereby operates in accordance with any of the embodiments described herein. For example, the processor 610 may receive data and then may apply the instructions of the programs 612, 614 to configure the network driver and switch.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving configuration data at a source node of a communication network configured as a Time Sensitive Network (TSN), which meets a set of quality of service (QOS) requirements, wherein the received configuration data comprises one or more segregation features and a transmission schedule;
obtaining data from a data source;
determining whether or not the data includes at least one of the one or more segregation features based on the received configuration data;
in response to a determination that the data does not include at least one of the one or more segregation features, obtaining a data frame in accordance with a default priority;
in response to a determination that the data includes at least one of the one or more segregation features, obtaining a data frame in accordance with the one or more segregation features;
transmitting the data frame to a destination node via network path according to the transmission schedule, wherein the transmission schedule specifies a designated time of data frame transmission to achieve the set of quality of service (QoS) requirements; and
dynamically changing the transmission schedule in accordance with a change in the received configuration data, wherein the change in the received configuration data is based upon a change in the set of quality of service (QOS) requirements.

2. The method of claim 1, wherein the configuration data further comprises one or more data frame tags and wherein the method further comprises, in response to the determination that the data includes at least one of the one or more segregation features, obtaining the data frame for transmission based on the one or more data frame tags received in the configuration data.

3. The method of claim 2, wherein the one or more data frame tags comprise a destination Media Access Control (MAC) address, a Virtual Lan Identifier (VLAN), or a Priority Code Point (PCP).

4. The method of claim 2, further comprising providing a configuration map that includes information defining a relationship between at least one of the one or more segregation features and at least one of the one or more data frame tags, wherein the at least one of the one or more data frame tags provides a frame format for a data frame.

5. The method of claim 1, wherein the one or more segregation features are at least one of a packet content, a Quality of Service (QOS) parameter, a port number, an IP source address, or an IP destination address.

6. The method of claim 5, wherein the QoS parameter indicates whether the data frame is critical or non-critical.

7. The method of claim 5, wherein the port number is at least one of a Transmission Control Protocol (TCP) port and a User Datagram Protocol (UDP) port.

8. The method of claim 1, wherein the one or more segregation features comprise at least a packet entropy of the data packet.

9. The method of claim 1, wherein the transmission schedule comprises at least one of a period, a cycle time, and a transmission offset.

10. The method of claim 9, wherein the determining that one or more segregation features are present in the one or more data packets is based on the received configuration data and the configuration map, including determining a match between a feature of the one or more data packets and at least one of the one or more segregation features with reference to a threshold value.

11. The method of claim 1, wherein the network path comprises at least one or more transmission queue gates that are opened and closed according to the designated time of data frame transmission.

12. The method of claim 11, wherein multiple redundant copies of the data frame are transmitted between the source node and the destination node through the network path.

13. The method of claim 1, wherein multiple redundant copies of the data frame are routed through at least two mutually exclusive network paths.

14. The method of claim 1, wherein obtaining the data frame includes:
determining a frame format in accordance with the at least of the one or more segregation features; and
dividing the data into the data frame according to the frame format.

15. A system for implementing configuration of a Time Sensitive Network (TSN), the system comprising a processor, a communication device and a memory, the system configured to:
receive, by the communication device, configuration data at a source node of a communication network configured as a Time Sensitive Network (TSN), which meets a set of quality of service (QOS) requirements, wherein the received configuration data comprises one or more segregation features and a transmission schedule;
obtain, by the processor, data from a data source;
determine, by the processor, whether or not the data includes at least one of the one or more segregation features based on the received configuration data;
in response to a determination that the data does not include at least one of the one or more segregation features, obtain, by the processor, a data frame in accordance with a default priority;
in response to a determination that the data includes at least one of the one or more segregation features, obtain, by the processor, a data frame in accordance with the one or more segregation features;
transmit, by the communication device, the data frame to a destination node via network path according to the transmission schedule, wherein the transmission schedule specifies a designated time of data frame transmission to achieve the set of quality of service (QOS) requirements; and
dynamically change, by the processor, the transmission schedule in accordance with a change in the received configuration data, wherein the change in the received configuration data is based upon a change in the set of quality of service (QOS) requirements.

16. The system of claim 15, wherein the configuration data further comprises one or more data frame tags and wherein, in response to the determination that the data includes at least one of the one or more segregation features, the processor and memory are further configured to: obtain the data frame for transmission based on the one or more data frame tags received in the configuration data.

17. The system of claim 16, wherein the one or more data frame tags comprise a destination Media Access Control (MAC) address, a Virtual Lan Identifier (VLAN), or a Priority Code Point (PCP).

18. The system of claim 16, wherein the one or more segregation features are at least one of a packet content, a Quality of Service (QOS) parameter, a port number, an IP source address, and an IP destination address.

19. The system of claim 18, wherein the QoS parameter indicates whether the data frame is critical or non-critical.

20. The system of claim 18, wherein the port number is at least one of a Transmission Control Protocol (TCP) port and a User Datagram Protocol (UDP) port.

21. The system of claim 16, further configured to provide a configuration map that includes information defining a relationship between at least one of the one or more segregation features and at least one of the one or more data frame tags, wherein the at least one of the one or more data frame tags provides a frame format for a data frame.

22. The system of claim 21, further configured to determine that one or more segregation features are present in the one or more data packets is based on the received configuration data and the configuration map, including determine a match between a feature of the one or more data packets and at least one of the one or more segregation features with reference to a threshold value.

23. The system of claim 15, wherein the one or more segregation features comprise at least a packet entropy of the data packet.

24. The system of claim 15, wherein the transmission schedule comprises at least one of a period, a cycle time, and a transmission offset.

25. The system of claim 15, wherein the network path comprises at least one or more transmission queue gates that are opened and closed according to the designated time of data frame transmission.

26. The system of claim 25, wherein multiple redundant copies of the data frame are transmitted between the source node and the destination node through the network path.

27. The system of claim 15, wherein multiple redundant copies of the data frame are routed through at least two mutually exclusive network paths.

28. The system of claim 15, wherein, to obtain the data frame, the processor and the memory are configured to:
determine a frame format in accordance with the at least of the one or more segregation features; and
divide the data into the data frame according to the frame format.

29. A first node of a communication network, the first node comprising a processor, a communication device and a memory, the first node configured to:
transmit, by the communication device, data to a second node of the communication network, wherein:
the communication network is configured as a Time Sensitive Network (TSN), which meets a set of quality of service (QOS) requirements,
configuration data comprising one or more segregation features and a transmission schedule is received, and whether or not the data includes at least one of the one or more segregation features based on the received configuration data is determined,
in response to a determination that the data does not include at least one of the one or more segregation features, a data frame in accordance with a default priority is obtained,
in response to a determination that the data includes at least one of the one or more segregation features, a data frame in accordance with the one or more segregation features is obtained,
the data frame is transmitted to a destination node via network path according to the transmission schedule, wherein the transmission schedule specifies a designated time of data frame transmission to achieve the set of quality of service (QOS) requirements,
the transmission schedule is dynamically changed in accordance with a change in the received configuration data, and the change in the received configuration data is based upon a change in the set of quality of service (QOS) requirements.

\* \* \* \* \*

UNITED STATES PATENT AND TRADEMARK OFFICE
CERTIFICATE OF CORRECTION

PATENT NO. : 12,375,417 B2
APPLICATION NO. : 18/471040
DATED : July 29, 2025
INVENTOR(S) : Frangieh et al.

Page 1 of 1

It is certified that error appears in the above-identified patent and that said Letters Patent is hereby corrected as shown below:

In the Claims

Column 16, Line 6, in Claim 1, delete "(QOS)" and insert --(QoS)--;

Column 16, Line 29, in Claim 1, delete "(QOS)" and insert --(QoS)--;

Column 16, Line 48, in Claim 5, delete "(QOS)" and insert --(QoS)--;

Column 17, Line 25, in Claim 15, delete "(QOS)" and insert --(QoS)--;

Column 17, Line 44, in Claim 15, delete "(QOS)" and insert --(QoS)--;

Column 17, Line 50, Claim 15, delete "(QOS)" and insert --(QoS)--;

Column 17, Line 64, Claim 18, delete "(QOS)" and insert --(QoS)--;

Column 18, Line 46, Claim 29, delete "(QOS)" and insert --(QoS)--;

Column 18, Line 64, Claim 29, delete "(QOS)" and insert --(QoS)--;

Column 19, Line 2, Claim 29, delete "(QOS)" and insert --(QoS)--.

Signed and Sealed this
Sixteenth Day of September, 2025

Coke Morgan Stewart
*Acting Director of the United States Patent and Trademark Office*